United States Patent [19]

Schacht

[11] Patent Number: 5,053,919

[45] Date of Patent: Oct. 1, 1991

[54] LOADCENTER "PLUG-IN" SURGE PROTECTOR

[76] Inventor: Ezra L. Schacht, 1620 W. Main St., Houston, Tex. 77006

[21] Appl. No.: 493,420

[22] Filed: Mar. 14, 1990

[51] Int. Cl.$^5$ ............................................. H02B 1/20
[52] U.S. Cl. ................................... 361/363; 361/356; 361/361
[58] Field of Search ................... 200/5, 14, 50 C, 307; 335/8, 9, 10, 11; 361/102, 115, 117, 118, 346, 353–355, 361, 363, 376, 393, 396

[56] References Cited

U.S. PATENT DOCUMENTS

| | | | |
|---|---|---|---|
| 3,134,051 | 5/1964 | Lyon | 335/11 |
| 3,403,301 | 9/1968 | Mrowka et al. | 361/353 |
| 4,181,924 | 1/1980 | Thomas et al. | 361/353 |
| 4,642,733 | 2/1987 | Schacht | 361/361 |
| 4,646,199 | 2/1987 | M'Sadoques et al. | 361/353 |
| 4,884,047 | 11/1989 | Baginski et al. | 361/353 |

*Primary Examiner*—Gregory D. Thompson

[57] ABSTRACT

Adding "plug in" surge protective devices, particularly in loadcenters already installed and in use, reduces the number of "stab spaces" available for circuit breakers. A breaker may be combined with a surgeprotector, both connected in parallel to a "stab" on the load center bus, or having a common bus contact within the combination breaker/protector, is thus both desirable and frequently necessary. The apparatus provides greater flexibility of location for a "plug in" surge protector in a loadcenter by making the surge protector adaptable for mounting in single "thick" or "thin" breaker spaces, and for combining a "thin" breaker with a "thin" surge protector for use within a single "thick" breaker space in the loadcenter. The invention provides a method for separating a defective breaker or surge protector from the combination and for easy replacement of the defective element. Surge protectors may thus be added to the loadcenter, one for each bus it is desired to protect, without requiring additional "stab spaces."

1 Claim, 2 Drawing Sheets

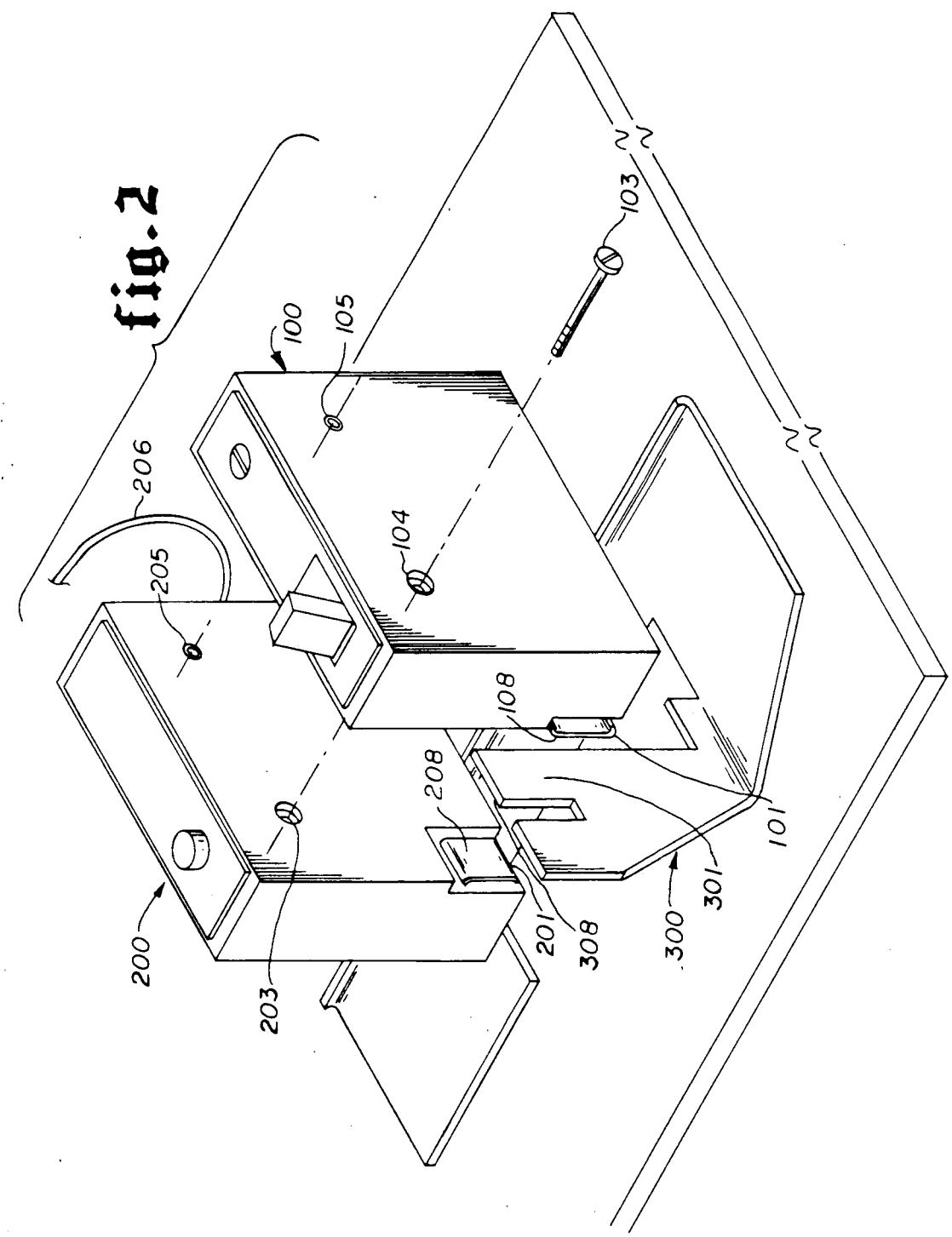

LOADCENTER "PLUG-IN" SURGE PROTECTOR

BACKGROUND OF THE INVENTION

In U.S. Pat. No. 4,642,733 is disclosed a "plug in" protective device, for installation within loadcenters, for the dissipation of line surges and the like. The device comprises a "plug in" surge protector of physical width and mounting means compatible with those of conventional "plug in" circuit breakers.

Such "plug in" surge protectors need not be "paired" but may be individually mounted within an operating loadcenter, wherever "stab mounting space" is available, at least one protecting the circuits on at least one bus.

Adding "plug in" surge protective devices, particularly in loadcenters already installed and in use, reduces the "stab spaces" available for circuit breakers. An alternate embodiment comprising a breaker combined with a surgeprotector, both connected in parallel to a "stab" on the load center bus, or having a common bus contact within the combination breaker/protector, is thus both desirable and frequently necessary.

The problem of limited or unavailable "stab spaces" in loadcenters has over the years been addressed by most loadcenter manufacturers, by providing a "thin" breaker, usually one half the thickness of the original "thick" breaker, but having the same current rating. In similar fashion, a "thin" surge protector, having suitable operating characteristics, can be made in the manner of the "thick" one.

"Plug-in thin" breakers of some manufacturers (FIG. 1) may be independent devices, the "stabs" plugged directly into "stabgripper" apertures in the bus.

"Plug-in thin" breakers of other manufactures (FIG. 2) may have a single "bus stab contact" which engages with a "mating stab" formed by lancing and bending the bus metal, or by fastening a "finger" to the bus. The single "bus stab contact" within the unitary breaker enclosure feeds two, or even four, "thin" breakers, and has been factory assembled. One or two of these breakers may be replaced, in this invention, by surge protectors, of similar construction, and having appropriate mounting means.

Study should be given to the "working life" of the conventional breaker compared with that of a MOV type surge protector. If the estimated life of a MOV plug-in element is much less than that of a conventional plug-in breaker, as may be the case in areas with frequent voltage surges, it should be possible to easily separate a defective MOV element from a plug-in breaker which yet has years of useful life, and replace only the defective MOV element.

Such an objective can be achieved for the bus and breaker construction shown in FIG. 2, by making provision for each of the elements to make contact on opposite sides of the load center "stab," and by providing means for quickly exchanging either a defective breaker or surge protector element.

OBJECTS OF PREFERRED EMBODIMENTS OF THE INVENTION

It is therefore an objective of one embodiment of the invention to provide greater flexibility of location for a "plug in" surge protector in a loadcenter by making the surge protector adaptable for mounting in single "thick" or "thin" breaker spaces, when construction of the loadcenter bussing permits such installation.

It is a further objective of the invention to provide means for detaching a defective breaker or surge protector from the combination and to easily replace the defective element.

It is a further object to add surge protectors to the loadcenter, one for each bus it is desired to protect, without requiring additional "stab spaces."

BRIEF DESCRIPTION OF THE DRAWINGS

In FIG. 2 is shown a pictorial view of a modified "plug-in" breaker having a portion of a loadcenter bus "stab gripper," and a pictorial view of a modified "plug-in" surge protector having a mating portion of a loadcenter bus "stab gripper," and when both are locked together by securing devices provided, a solid grip on the bus "stab" is accomplished when the assembly is installed in the loadcenter.

DESCRIPTION OF PREFERRED EMBODIMENTS

Figure 1:
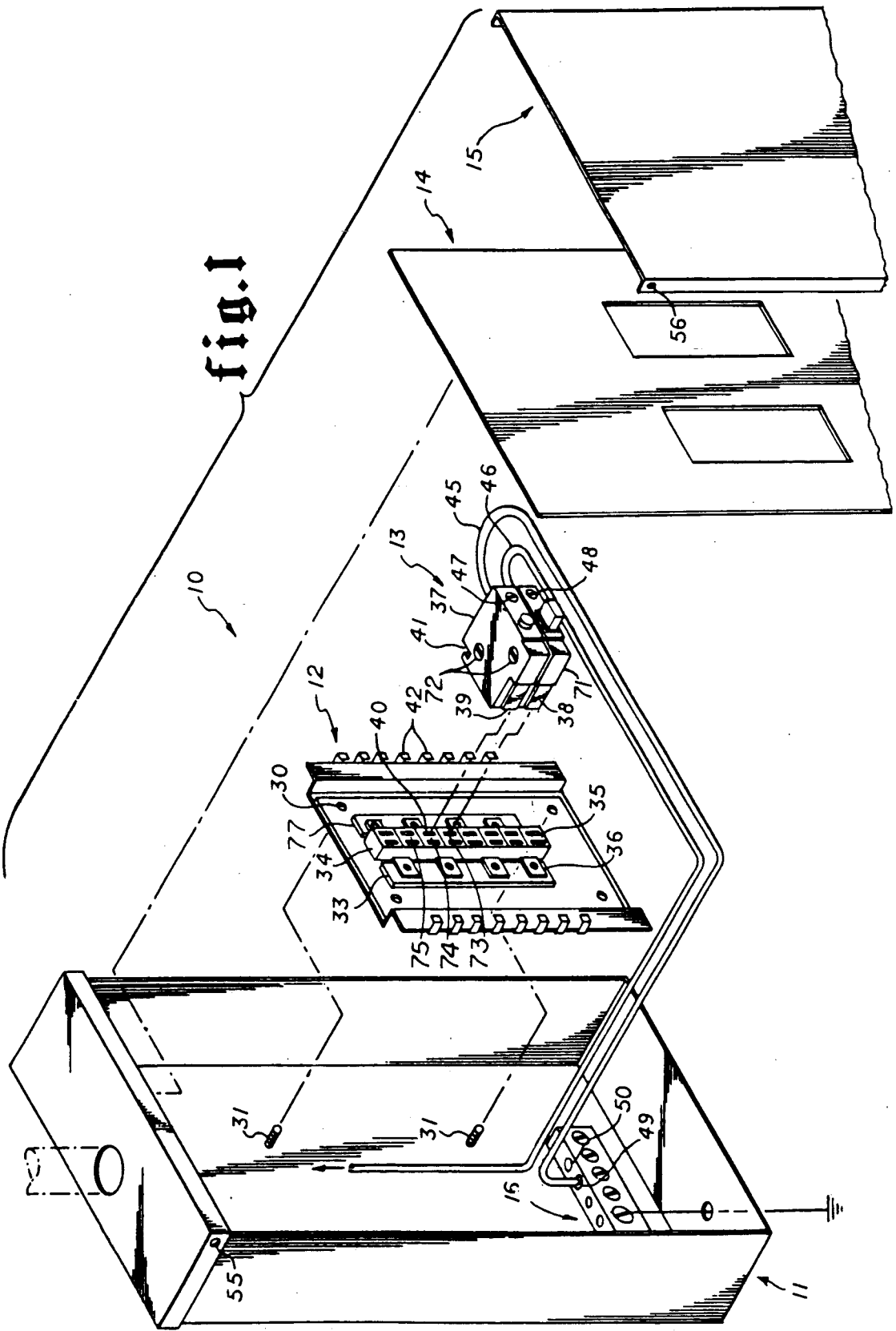
In FIG. 1 is shown a pictorial view of a modified "plug-in" breaker having a conventional loadcenter bus "stab gripper," combined with a surge protector, both elements physically joined (or held in position between devices on both sides in the load-center), and each electrically connected to one loadcenter bus at one "stab."

With reference now to FIG. 1, there may be seen an apparatus 10, in combination, of the present invention. An enclosure 11 serves as a housing for the pan 12, upon which is mounted the combination breaker 71/surge protector 37, comprising assembly 13 in alignment with the conventional breakers (not shown). The apertures 30 in mounting pan 12 engage with studs 31, securing the pan within enclosure 11. The neutral/system grounding bus 16 may also be mounted within enclosure 11.

Insulatively mounted on pan 12 are the phase buses 33 and 77, and the molded insulated blocks 34 which support the "stab receptors" 35 in proper position. The tail-like tabs 36 of the "stabreceptors" 35 connect mechanically and electrically to their respective buses 33. The combination breaker 71/surge protector 37 (assembly 13) is assembled with singlepole surge protector 37 and circuit breaker 71 by fastening means 72. The respective breaker stab 38 and protector stab 39 enter "stab receptor slots" 73 and 74.

The combination breaker 71/surge protector 37 (shown as 13) is now mechanically secured to the pan 12, and electrically connected to bus 77. Now conductor 45 is connected to surge protector 37 at loadside screw 47 with the other end connected to the grounded bus 16 at aperture 49. Conductor 46 is connected to circuitbreaker 71 at load terminal screw 48, and continues on to the circuit to be protected. Conductors 45 and 46 are exaggerated in length for clarity in the drawing. In actuality, conductor 45 should have as short a length and as reasonably large a crosssection as practicable, combined with solid grounding at bus 16, or to a solid ground if bus 16 is isolated from ground.

In FIG. 1, as noted above, in order to find space within a loadcenter for "plug-in" surge protection, it is sometimes necessary or desirable to use a breaker of half-thickness (one-half inch instead of one-inch, for example) and combine the breaker with a surge protector of equivalent thickness. In general, it would be preferable to have both breaker 71 and protector 37 connected to the same bus. Thus both are shown connected to stab plate 40 at slots 73 and 74. This differs from the usual installation of a doublepole breaker (240 volts) which would engage with "stabslot" 74 fed by bus 77 and "stabslot" 75 fed from bus 33. It may be useful to have cliplike means which in combination with the "heel" engaging notch 41 of assembly 13, and pan fingers 42, limit the insertion and installation of assembly 13 to adjacent slots 73 and 74 of the same polarity.

Deadfront 14 engages with the stepped tops of conventional plug-in breakers and assembly 13. Front cover 15 engages with enclosure 11 by passing bolts through both pairs of holes 55 and 56.

In FIG. 2 is shown a pictorial view of a modified "plug-in" breaker 100 having a portion of a loadcenter bus "stab gripper" 101, and a pictorial view of a modified "plug-in" surge protector 200 having a mating portion of a loadcenter bus "stab gripper" 201, and when both are locked together by securing device means, such as threaded screw 103, passing through an insulated counterbored hole 104 through breaker 100, drawing breaker 100 and surge protector 200 together, but with means for maintaining a precise distance between them. This distance should be carefully selected, so that "bus stab contact area" 301 of bus 300 is snugly engaged between mating surfaces of stab grippers 101 and 201, and a solid grip on the bus "stab" area 301 is obtained when the assembly of breaker 100 and protector 200 is installed in the loadcenter.

The mating surfaces 108 of lineside contact means 101 and 208 of 201 must make excellent electrical contact with bus surfaces 301 and 308. This result is achieved by: precise molding of the breaker and surge protector external dimensions and supporting parts for the lineside contact means 101 and 201; by close control of the spring resilience of these parts; and by providing means of adjustment if required. In this way the two separable parts provide the same effective grip on the mating areas of the bus surfaces 301 and 308 as can be achieved by the u-clip spring found in some breaker assemblies.

Throughbores 105 and 205 are representative of securing means for the individual enclosures of breaker 100 and protector 200, and may also, if long enough to pass through both enclosures, serve to permanently fix both breaker 100 and protector 200 together as a unit. On the other hand, alternate securing means 104 may be removed, permitting selective replacement of defective breaker 100 or surge protector 200.

FIG. 2 makes clear why the issue of single polarity was raised in the discussion of FIG. 1. Contacts 101 and 201 must engage with one contact area 301 of one bus 300. For consistency, this should be the general procedure. Furthermore, mating bus stab clips 101 and 201 may be combined in U-cliplike form if the selective replacement feature is not desired.

Other embodiments of this invention may now become apparent to those skilled in the art, and it intended that such embodiments be included in the following claims.

What is claimed is:

1. A loadcenter enclosure comprising:
 (i) a plurality of branch circuit breakers with operating levers;
 (ii) an interior mounting pan on which said breakers are mounted;
 (iii) a plurality of buses, said buses insulatively mounted upon said interior mounting pan;
 (iv) mounting pan supporting means;
 (v) a dead-front panel, having apertures aligned with said operating levers of said breakers and means securing said dead-front panel to said enclosure;
 (vi) a front cover over said dead-front panel;
 (vii) neutral and grounding bus means in said enclosure;
 (viii) a surge protection device, containing means of protection of said load center against line surges, the loadside contact of said surge protection device having electrical connection means to said grounding bus means;
 at least one of said branch circuit breakers and said surge protection device having independent lineside contact means for mechanical and electrical engagement with contact means of at least one of said buses, said one circuit breaker and said surge protection device being fastened together by adjustable and separable means to allow adjustable spacing between said one circuit breaker and said surge protection device to allow each said independent contact means to be mechanically and electrically engaged with said one bus.

* * * * *